US 9,869,386 B2

(12) United States Patent
Park et al.

(10) Patent No.: US 9,869,386 B2
(45) Date of Patent: Jan. 16, 2018

(54) SHIFT CONTROL METHOD OF ELECTRONIC SHIFT LEVER

(71) Applicant: Hyundai Motor Company, Seoul (KR)

(72) Inventors: Han Gil Park, Suwon-si (KR); Yang Rae Cho, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 198 days.

(21) Appl. No.: 14/883,486

(22) Filed: Oct. 14, 2015

(65) Prior Publication Data

US 2016/0312886 A1 Oct. 27, 2016

(30) Foreign Application Priority Data

Apr. 21, 2015 (KR) ........................ 10-2015-0055662

(51) Int. Cl.
| | | |
|---|---|---|
| *B60W 30/08* | (2012.01) | |
| *F16H 61/16* | (2006.01) | |
| *F16H 61/02* | (2006.01) | |

(52) U.S. Cl.
CPC ......... *F16H 61/0204* (2013.01); *F16H 61/16* (2013.01); *B60W 2422/90* (2013.01); *B60Y 2400/3042* (2013.01)

(58) Field of Classification Search
CPC ......... B60W 2422/90; B60W 2030/082; F16H 61/16; B60T 2201/024
See application file for complete search history.

(56) References Cited

U.S. PATENT DOCUMENTS

| 4,359,910 A | * | 11/1982 | Numazawa | ............. F16H 61/18 |
| | | | | 74/473.24 |
| 6,699,155 B2 | * | 3/2004 | Nagasaka | ........... F16H 59/0204 |
| | | | | 192/220 |
| 8,290,654 B2 | * | 10/2012 | Becker | ................... B60K 6/365 |
| | | | | 701/22 |
| 8,483,945 B2 | * | 7/2013 | Herink | ...................... B60T 7/22 |
| | | | | 180/232 |
| 2005/0071071 A1 | * | 3/2005 | Nagata | .................. B60K 28/14 |
| | | | | 701/70 |
| 2009/0287383 A1 | * | 11/2009 | Fujii | ................... F16H 63/3491 |
| | | | | 701/51 |
| 2014/0074372 A1 | * | 3/2014 | Kaita | ....................... B60T 7/22 |
| | | | | 701/99 |

FOREIGN PATENT DOCUMENTS

| JP | 2003-28291 A | 1/2003 | |
| JP | 2007-198574 A | 8/2007 | |
| KR | 10-2002-0054124 A | 7/2002 | |
| KR | 20030026452 A | * 4/2003 | ............ F16H 61/18 |
| KR | 10-2010-0123150 A | 11/2010 | |
| KR | 10-2013-0044088 A | 5/2013 | |

OTHER PUBLICATIONS

KR20030026452 translation filed Jun. 25, 2017.*

* cited by examiner

*Primary Examiner* — Tisha Lewis

(74) *Attorney, Agent, or Firm* — Morgan, Lewis & Bockius LLP

(57) ABSTRACT

A shift control method of an electronic shift lever may include detecting a collision of a vehicle when the vehicle is in an ignition-on state, detecting a shift range of the electronic shift lever, and preventing shifting by interrupting delivery of a signal for changing the shift range to a transmission, when the signal for changing the shift range is detected within a predetermined time after the detection of the collision.

6 Claims, 3 Drawing Sheets

SHIFT CONTROL METHOD OF ELECTRONIC SHIFT LEVER

CROSS-REFERENCE(S) TO RELATED APPLICATION

The present application claims priority to Korean Patent Application Number 10-2015-0055662 filed Apr. 21, 2015, the entire contents of which is incorporated herein for all purposes by this reference.

BACKGROUND OF THE INVENTION

Field of the Invention

The present invention generally relates to a shift control method of an electronic shift lever. More particularly, the present invention relates to a shift control method of an electronic shift lever, which prevents a further secondary collision by impeding shifting or by shifting into a parking range, when a signal for changing a shift range is generated by the movement of the electronic shift lever during a collision.

Description of Related Art

Generally, a vehicle in which an automatic transmission is mounted controls oil pressure within a shift range set according to the vehicle speed, whereby a transmission gear automatically operates to shift into a target shift range.

To perform the shifting process, the automatic transmission sets up a gear ratio using a hydraulic circuit, a planetary gear, and friction elements; and a transmission control unit (TCU) serves to control such components.

Unlike an existing mechanical shift lever, a shift-by-wire (hereinafter, referred to SBW) automatic transmission is an electronic gear shift system without a mechanical coupler between the transmission and a shift lever, such as a cable. When a lever sensor value, which is obtained by operating the electronic shift lever, is delivered to a TCU, a solenoid or an electric motor is operated by an electronic signal instructed by the TCU. Then, by the operation of the solenoid or the electric motor, oil pressure is applied to or shut off from a hydraulic circuit for each shift position, whereby the transmission may electronically perform the shift control.

Therefore, an automatic transmission based on SBW delivers a driver's intention of shifting, in a form of an electric signal, to a TCU through the simple operation of an electronic shift lever or a button. Accordingly, shifting into a driving range (D), a reverse range (R), a neutral range (N), a parking range (P), and the like is easily performed. Also, the size of the shift lever can be reduced, thus securing more space between a driver's seat and a passenger's seat.

An electronic shift lever is simple to operate but when an external force is applied, it tends to be operated against a driver's intention. Especially, by an external force from a collision, the shift lever moves regardless of the driver's intention, thus causing a signal that changes a shift range. This may lead to a secondary collision.

In other words, when a collision occurs while the shift range is in D, R, or N position, an electronic shift lever moves by inertia and may generate a signal that changes the shift range from D to R position, from R to D position, or from N to R position. In this case, because a TCU operates a transmission based on the signal of the shift lever, there may be a secondary collision with the car ahead or the car behind.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shift control method of an electronic shift lever, which prevents a secondary collision by impeding shifting or by shifting to a parking (P) range, when a signal for changing a shift range occurs during a collision.

According to various aspects of the present invention, a shift control method of an electronic shift lever may include detecting a collision of a vehicle when the vehicle is in an ignition-on state, detecting a shift range of the electronic shift lever, and preventing shifting by interrupting delivery of a signal for changing the shift range to a transmission, when the signal for changing the shift range is detected within a predetermined time after the detection of the collision.

The shift control method may further include, when the predetermined time has passed after the preventing shifting and a subsequent collision has not been detected, when the ignition is turned off and then turned on, enabling the shifting by releasing the interruption of the delivery of the signal to the transmission.

The shift control method may further include, when the predetermined time has passed after preventing the shifting and a subsequent collision has not been detected, when a signal for changing to a new shift range is generated, enabling the shifting by releasing the interruption of the delivery of the signal to the transmission.

The collision of the vehicle may be detected by a collision sensor or an airbag sensor.

The collision of the vehicle may occur inside the vehicle or outside the vehicle.

The shift range of the electronic shift lever may be detected by a lever sensor.

The shifting of the transmission may be controlled by a Transmission Control Unit (TCU), and the TCU may be controlled by an Electronic Control Unit (ECU).

When a signal for changing the shift range is not generated within the predetermined time after a collision of the vehicle occurs, the transmission may maintain an immediately pre-collision shift range.

According to various aspects of the present invention, a shift control method of an electronic shift lever may include detecting, by a collision sensor or an airbag sensor, a collision of a vehicle when the vehicle is in an ignition-on state, detecting, by a lever sensor, a shift range of the electronic shift lever immediately before the collision, detecting, by the lever sensor, a shift range of the electronic shift lever immediately after the collision, and interrupting, by control of a Transmission Control Unit (TCU), a shifting process so that a signal for changing the shift range, which is generated immediately after the collision, is not delivered to a transmission, when the shift range immediately before the collision and the shift range immediately after the collision are different within a predetermined time after the detection of the collision.

In a state in which the predetermined time has passed after the interruption of the signal for changing the shift range not to be delivered to the transmission by the control of the TCU and in which a subsequent collision has not occurred, when an ignition is turned off and then turned on, a signal for changing the shift range may be delivered to the transmission by the control of the TCU.

In a state in which a predetermined time has passed after the interruption of the signal for changing the shift range not to be delivered to the transmission by the control of the TCU and in which a subsequent collision has not occurred, when a signal for changing the shift range is generated again, the signal for changing the shift range may be delivered to the transmission by control of the TCU.

When a collision of the vehicle occurs and when the immediately pre-collision shift range is the same as the shift range immediately after the collision, the transmission may maintain the immediately pre-collision shift range by control of the TCU.

According to various aspects of the present invention, a shift control method of an electronic shift lever may include detecting, by a collision sensor or an airbag sensor, a collision of a vehicle when the vehicle is in an ignition-on state, detecting, by a lever sensor, a shift range of the electronic shift lever immediately before the collision, detecting, by the lever sensor, a shift range of the electronic shift lever immediately after the collision, and shifting, by control of a TCU, a transmission into a parking range, when the shift range immediately before the collision and the shift range immediately after the collision are different within a predetermined time after the detection of the collision.

According to the present invention, when a signal for changing a shift range of an electronic shift lever is generated during a collision, a transmission is not shifted for a predetermined time or is forcibly shifted into a parking (P) range, thus a further secondary collision may be prevented.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
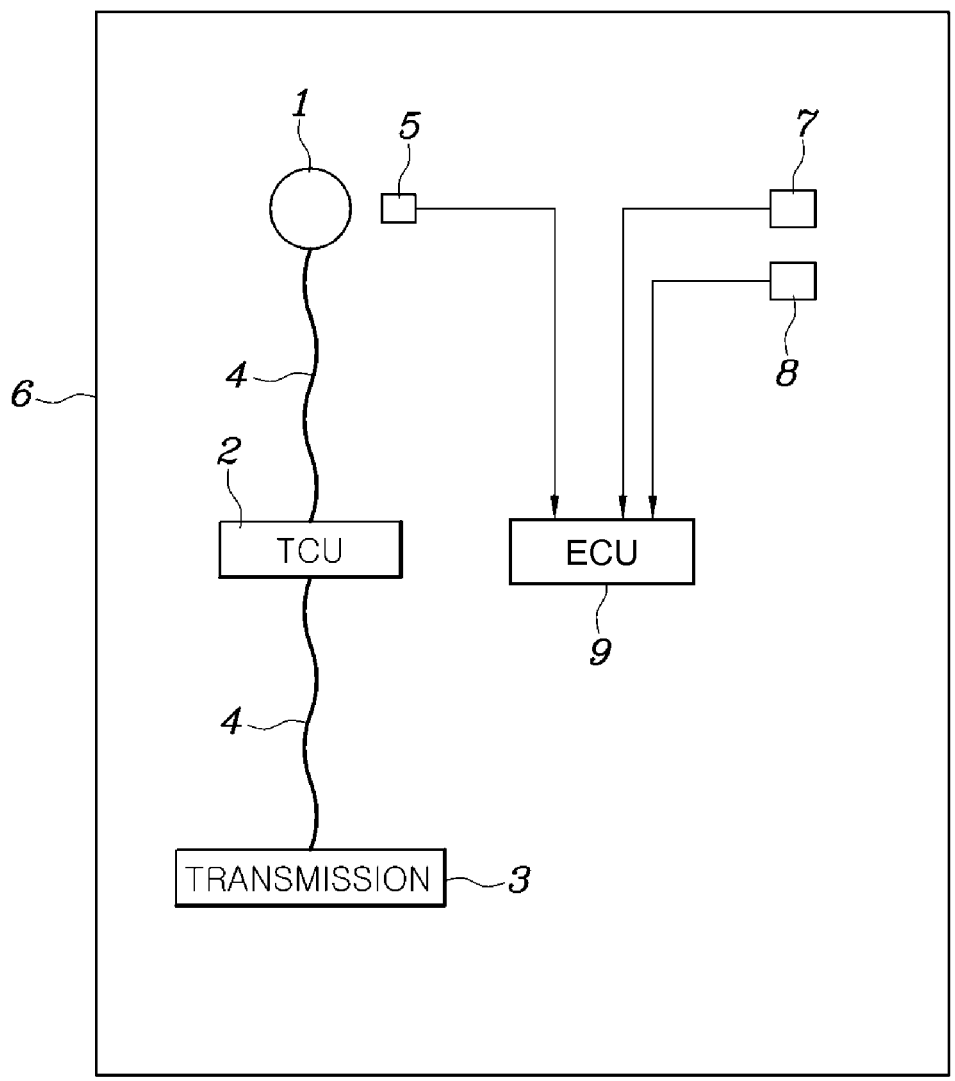
FIG. 1 is a block diagram for implementing an exemplary shift control method according to the present invention.
Figure 2:
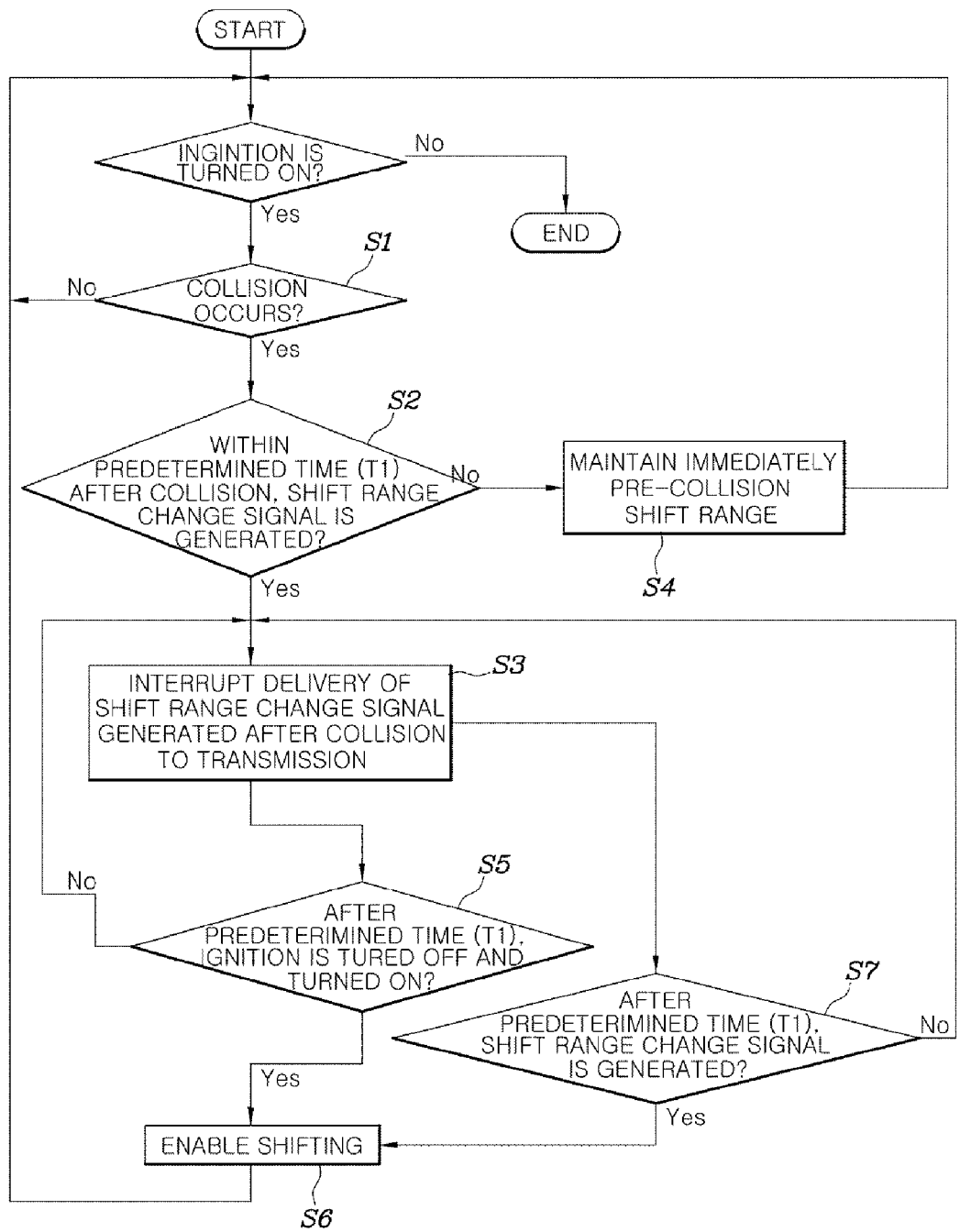
FIG. 2 is a flow diagram for explaining an exemplary shift control method of an electronic shift lever according to the present invention.
Figure 3:
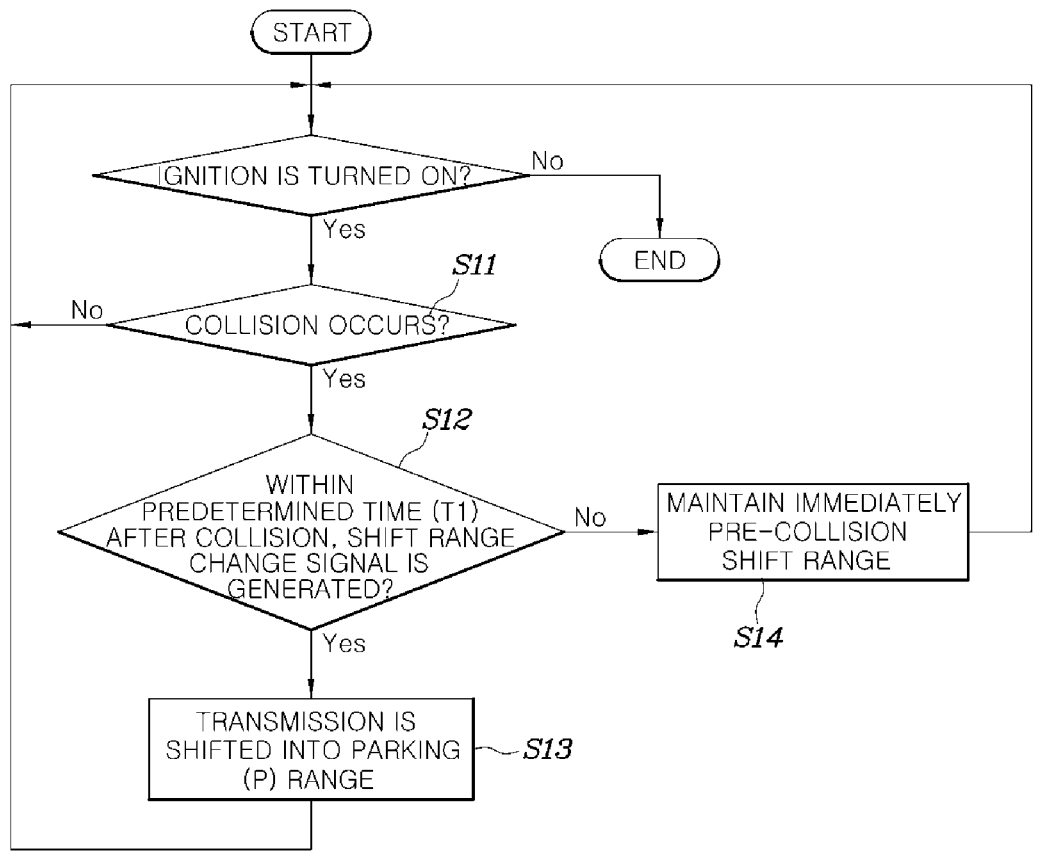
FIG. 3 is a flow diagram for explaining an exemplary shift control method of an electronic shift lever according to the present invention.

As illustrated in FIG. 1 to FIG. 3, in the case of a shift-by-wire (SBW) automatic transmission, a wire 4 for delivering an electric signal connects between an electronic shift lever 1 and a Transmission Control Unit (TCU), and connects between the TCU and a transmission. A lever sensor 5 detects a shift range of the electronic shift lever 1.

Various embodiments according to the present invention include a collision detection step in which a collision of a vehicle 6 is detected when the vehicle is in an ignition-on state, a range detection step in which a shift range of an electronic shift lever 1 is detected, and a shifting prevention step in which, when a collision occurs and a signal for changing the shift range is detected within a predetermined time (T1) after the collision, shifting is prevented by interrupting the delivery of the signal to the transmission 3.

The collision may occur inside or outside the vehicle 6, and is detected by a collision sensor 7 or an airbag sensor 8, which is installed in the vehicle.

Therefore, when the vehicle is in an ignition-on state, both a collision signal, which is detected by the collision sensor 7 or the airbag sensor 8, and a shift range signal of the electronic shift lever 1, which is detected by the lever sensor 5, are delivered to an Electronic Control Unit (ECU) 9.

The Electronic Control Unit (ECU) 9 determines whether a signal for changing the shift range is generated within the predetermined time (T1) after the collision, and controls the TCU 2 when determining that the signal is generated. Accordingly, the TCU 2 prevents the delivery of the signal for changing the shift range to the transmission 3, whereby the transmission 3 may not be shifted.

The ECU 9 can be referred to a lever-ECU of the electronic shift lever 1.

On the other hand, various embodiments according to the present invention further include a shifting permission step in which under the condition that the predetermined time (T1) has passed after the shifting prevention step and that a subsequent collision is not detected, when the ignition is turned off and then turned on or when a signal for changing to a new shift range is generated, shifting is enabled by releasing the interruption of the signal to the transmission.

In other words, in a case in which the predetermined time (T1) has passed since the TCU 2 has interrupted the delivery of the signal for changing the shift range, and in which another collision has not occurred, if an ignition of the vehicle is turned off and then turned on, a logic that has interrupted the delivery of the signal to the transmission is initialized. Since then, if a driver operates the electronic shift lever 1, a signal for changing the shift range is delivered to the transmission 3 and the shifting process is smoothly performed.

Also, in various embodiments according to the present invention, the transmission 3 maintains the immediately pre-collision shift range if a signal for changing the shift range has not been generated within the predetermined time (T1) after the collision of the vehicle 6 occurred.

Various embodiments of the present invention include a step in which a collision of a vehicle 6 is detected by a collision sensor 7 or an airbag sensor 8, when the vehicle is in an ignition-on state, a step in which a shift range of an electronic shift lever 1 is detected by a lever sensor 5 immediately before the collision, a step in which a shift range of the electronic shift lever 1 is detected immediately after the collision, and a step in which a transmission 3 is shifted into a parking (P) range by the control of a TCU 2 if the immediately pre-collision shift range is different from the shift range immediately after the collision within a predetermined time (T1) after the collision.

In other words, when a signal for changing the shift range is generated within the predetermined time (T1) after the collision, the TCU 2, which is controlled by an ECU 9, compels the transmission 3 to shift into a parking (P) range, so that a secondary collision with the vehicle ahead or the vehicle behind is prevented.

Hereinafter, the operation of various embodiments of the present invention is described referring to FIG. 2.

When a collision occurs in an ignition-on state of a vehicle, a collision signal detected by a collision sensor 7 or an airbag sensor 8 is delivered to an ECU 9, and the ECU 9 determines the collision of the vehicle at step S1.

Also, a shift range signal of an electronic shift lever 1, which is detected by a lever sensor 5, is delivered to the ECU 9.

When determining that the collision has occurred, the ECU 9 determines whether a signal for changing the shift range is generated within a predetermined time (T1) after the collision at step S2. When determining that the signal is generated, the ECU 9 controls a TCU 2 and the TCU 2 interrupts the delivery of the signal to a transmission 3 at step S3. Accordingly, the transmission 3 may not be shifted.

In other words, when a collision occurs while a shift range of the electronic shift lever 1 is in D, R, or N position, the electronic shift lever 1 moves by inertia and is prone to generate a signal for changing the shift range from D to R, R to D, or N to R position. In this case, because the TCU 2 operates the transmission 3 based on the signal of the shift lever 1, a secondary collision with a vehicle ahead or a vehicle behind may occur.

Therefore, in the present invention, when a signal for changing a shift range is generated within a predetermined time (T1) after a collision, the delivery of the signal to a transmission 3 is interrupted by a TCU 2 and the transmission 3 is not shifted, whereby a further secondary collision can be prevented.

On the other hand, when it is determined that a signal for changing the shift range is not generated within the predetermined time (T1) after the collision, the transmission 3 maintains the immediately pre-collision shift range by the control of the TCU 2 at step S4.

Also, in a case in which the predetermined time (T1) has passed since the signal for changing the shift range was interrupted not to be delivered to the transmission 3 by the control of the TCU 2 and in which a subsequent collision has not occurred, the ECU 9 determines whether a driver turns off and then turns on an ignition of a vehicle at step S5. When the ignition is turned off and then turned on, a logic, which has been controlled to interrupt the delivery of the shift range change signal to the transmission 3, is initialized.

Therefore, since then, if the driver operates the electronic shift lever 1, a signal for changing the shift range is delivered to the transmission 3 and the shifting process is normally performed at step S6.

In this case, when it is determined that the driver has not turned off and then turned on the ignition, the process returns to the step before S3.

Also, in a case in which the predetermined time (T1) has passed since the signal for changing the shift range was interrupted not to be delivered to the transmission 3 by the control of the TCU 2 and in which a subsequent collision has not occurred, the ECU 9 determines whether a signal for changing the shift range is generated again at step S7. If it is determined that the signal for changing the shift range is generated again, a signal, which is generated when the driver operates the electronic shift lever 1 after the determination, is delivered to the transmission 3 and the shifting process is normally performed at step S6.

Here, when it is determined that that the signal for changing the shift range is not generated again, the process returns to the step before S3.

Under the condition of a normal shift process, the above steps are repeatedly performed before the ignition of the vehicle is turned off.

Subsequently, the operation of various embodiments of the present invention are briefly described referring to FIG. 3.

When a collision occurs in an ignition-on state of a vehicle, a collision signal detected by a collision sensor 7 or an airbag sensor 8 is delivered to an ECU 9, and the ECU 9 determines the collision of the vehicle at step S11.

Also, a shift range signal of an electronic shift lever 1, which is detected by a lever sensor 5, is delivered to the ECU 9.

When determining that the collision has occurred, the ECU 9 determines whether an immediately pre-collision shift range is different from a shift range immediately after the collision, within a predetermined time (T1) after the collision, namely, whether a signal for changing the shift range is generated at step S12. When it is determined that the two shift ranges are different, namely, that the signal for changing the shift range is generated, the transmission 3 is shifted to a parking (P) range by the control of the TCU 2 at step S13.

In other words, in the present invention, if, within a predetermined time (T1) after the collision, an immediately pre-collision shift range is different from the shift range immediately after the collision, the transmission 3 is forcibly shifted to a parking (P) range by the control of the TCU 2, whereby a further secondary collision can be prevented.

On the other hand, within the predetermined time (T1) after the collision, if it is determined that the immediately pre-collision shift range is the same as the shift range immediately after the collision, namely, that the signal for changing the shift range is not generated, the transmission 3 maintains the immediately pre-collision shift range by the control of the TCU 2 at step S14.

As described above, various embodiments of the present invention compel a transmission 3 not to shift for a predetermined time or to shift to a parking (P) range, whereby a further secondary collision may be prevented and passenger safety may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control method of an electronic shift lever, comprising:
    detecting, by a collision sensor or an airbag sensor, a collision of a vehicle when the vehicle is in an ignition-on state;
    detecting, by a lever sensor, a shift range of the electronic shift lever immediately before the collision;
    detecting, by the lever sensor, a shift range of the electronic shift lever immediately after the collision; and
    interrupting, by control of a Transmission Control Unit (TCU), a shifting process so that a signal for changing the shift range, which is generated immediately after the collision, is not delivered to a transmission, when the shift range immediately before the collision and the shift range immediately after the collision are different within a predetermined time after the detection of the collision.

2. The shift control method of claim 1, wherein, in a state in which the predetermined time has passed after the interruption of the signal for changing the shift range not to be delivered to the transmission by the control of the TCU and in which a subsequent collision has not occurred, when an ignition is turned off and then turned on, a signal for changing the shift range is delivered to the transmission by the control of the TCU.

3. The shift control method of claim 1, wherein, in a state in which a predetermined time has passed after the interruption of the signal for changing the shift range not to be delivered to the transmission by the control of the TCU and in which a subsequent collision has not occurred, when a signal for changing the shift range is generated again, the signal for changing the shift range is delivered to the transmission by control of the TCU.

4. The shift control method of claim 1, wherein when a collision of the vehicle occurs and when the immediately pre-collision shift range is a same as the shift range immediately after the collision, the transmission maintains the immediately pre-collision shift range by control of the TCU.

5. A shift control method of an electronic shift lever, comprising:
    detecting, by a collision sensor or an airbag sensor, a collision of a vehicle when the vehicle is in an ignition-on state;
    detecting, by a lever sensor, a shift range of the electronic shift lever immediately before the collision;
    detecting, by the lever sensor, a shift range of the electronic shift lever immediately after the collision; and
    shifting, by control of a TCU, a transmission into a parking range, when the shift range immediately before the collision and the shift range immediately after the collision are different within a predetermined time after the detection of the collision.

6. The shift control method of claim 5, wherein when the collision of the vehicle occurs and the immediately pre-collision shift range is a same as the shift range immediately after the collision, the transmission maintains the immediately pre-collision shift range by control of the TCU.

* * * * *